Sheet II

Carl Necker's Improvements in Sewing Machines

117101

Witnesses:
Dr. Theodor Blanck

Inventor
Carl Necker

Sheet III

Carl Necker's Improvements in Sewing Machines.

Figure 3:
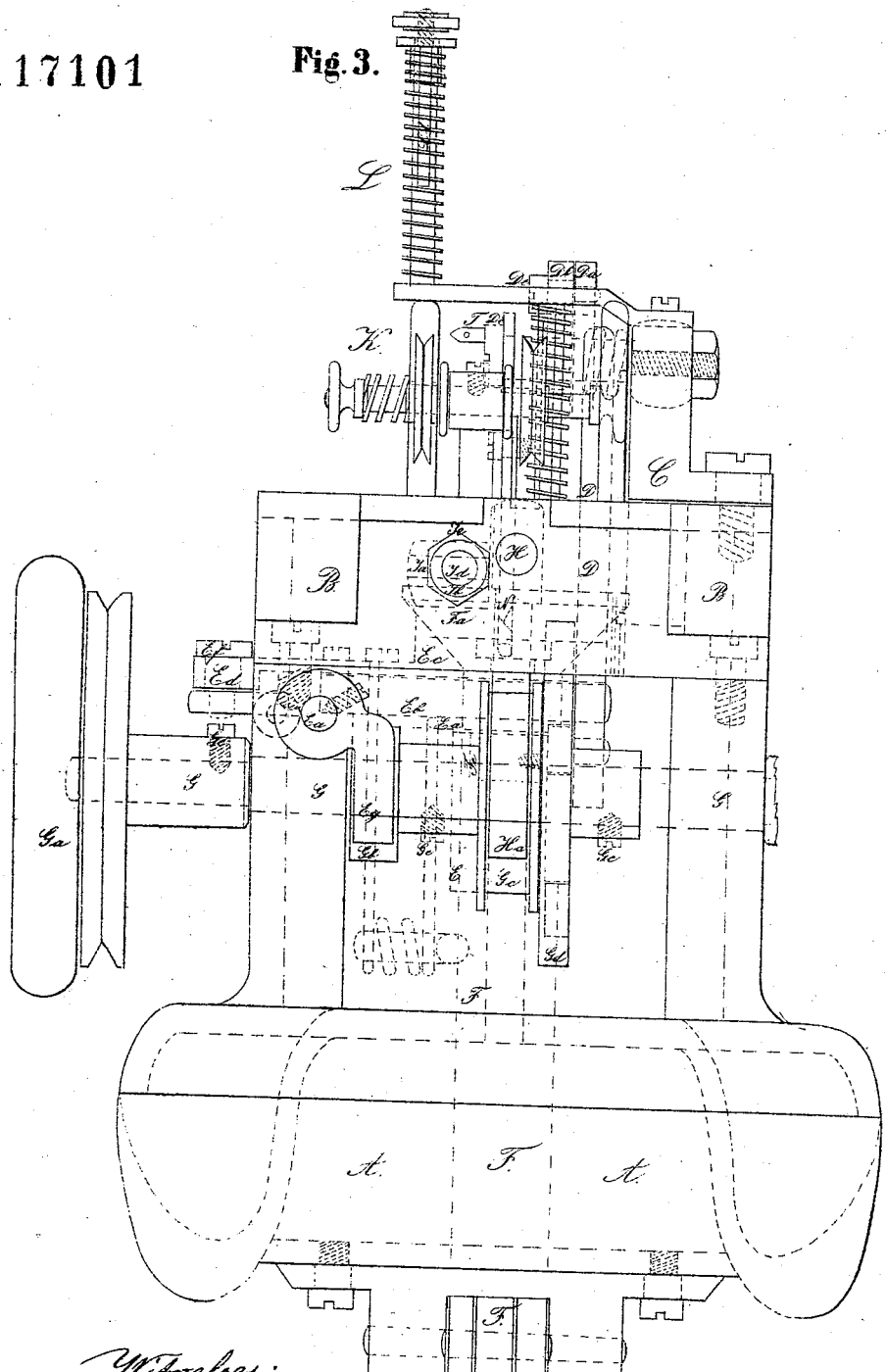

117101  Fig. 3.

Witnesses:
Dr Theodor Blanck.
Heinrich Maak.

Inventor
Carl Necker

Sheet IV.

Carl Necker's Improvements in Sewing Machines.

117101

Witnesses:
Dr. Theodor Blanch.

Inventor
Carl Necker

Sheet V.

*Carl Necker's Improvements in Sewing Machines*

117101

Witnesses:
Dr. Theodor Blanck.

Inventor
Carl Necker

Sheet VI.

*Carl Necker's Improvements in Sewing Machines.*

117101

Witnesses:
Dr. Theodor Blank
Heinrich Maerk

Inventor
Carl Necker

Sheet VII

Carl Necker's Improvements in Sewing Machines

117101

Witnesses:
Dr. Theodor Blanck

Inventor
Carl Necker

Sheet VIII
Carl Necker's Improvements in Sewing Machines
117101
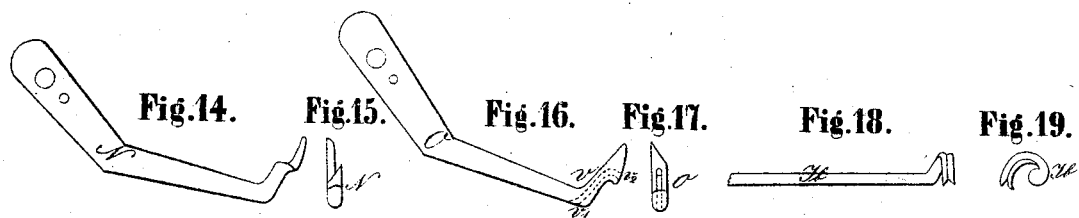
Witnesses:
Dr. Theodore Blanck
Inventor
Carl Necker Sheet IX
Carl Necker's Improvements in Sewing Machines.
117101
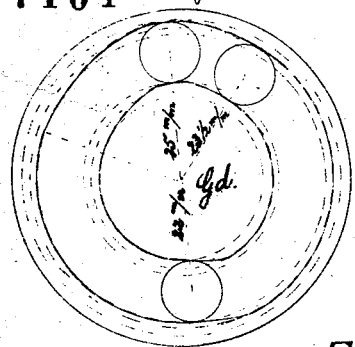
Fig. 25.
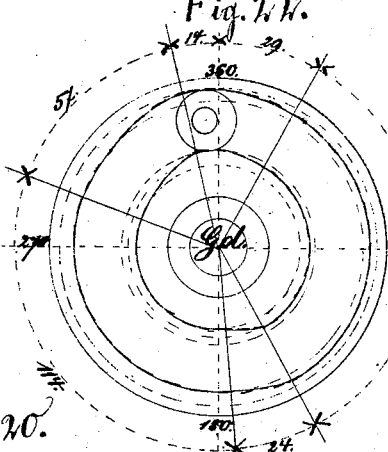
Fig. 22.
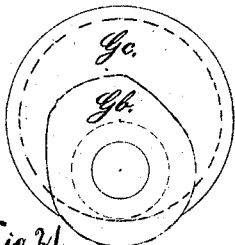
Fig. 23.
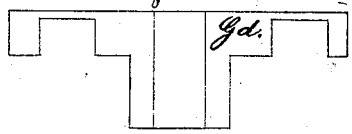
Fig. 20. Fig. 21.
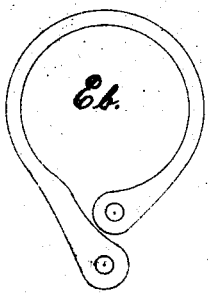
Fig. 26.
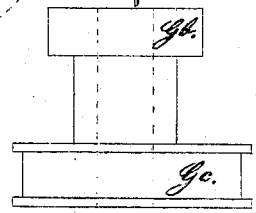
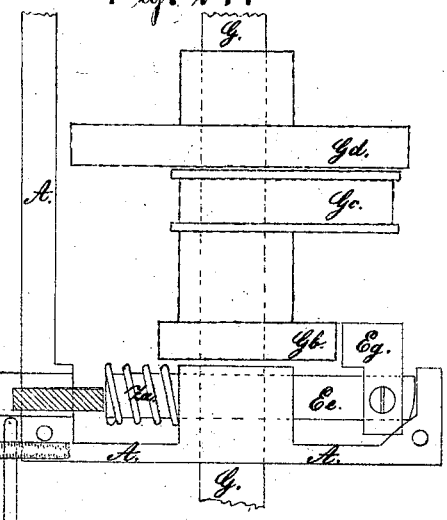
Fig. 24.
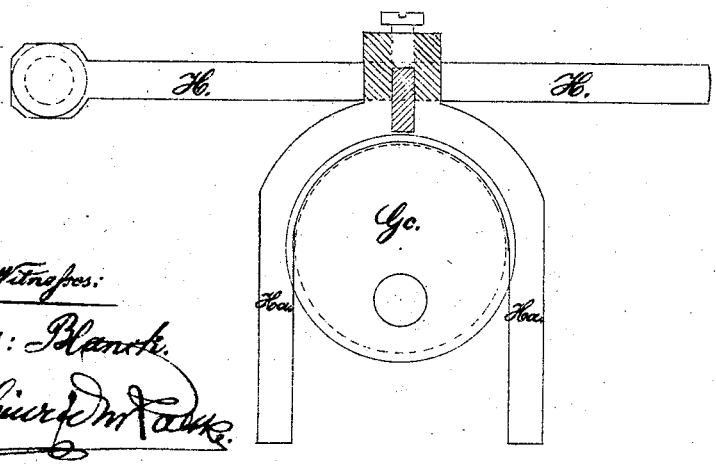
Fig. 27.
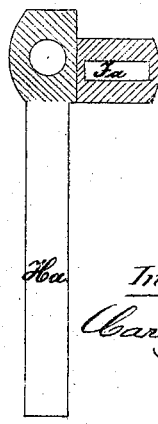
Fig. 28.
Witnesses:
Dr. Blank
Inventor
Carl Necker 117,101

UNITED STATES PATENT OFFICE.

CARL NECKER, OF BERLIN, PRUSSIA.

IMPROVEMENT IN SEWING-MACHINES.

Specification forming part of Letters Patent No. 117,101, dated July 18, 1871.

*To all whom it may concern:*

Be it known that I, CARL NECKER, of Berlin, in the Province of Brandenburg, in the Kingdom of Prussia, have invented certain Improvements in Sewing-Machines, of which the following is a specification:

The object of my invention is to combine in a single machine operations which have hitherto been performed by two separate machines of different construction; and my invention consists in certain novel combinations of devices, as will be hereinafter fully described.

Figure 1:
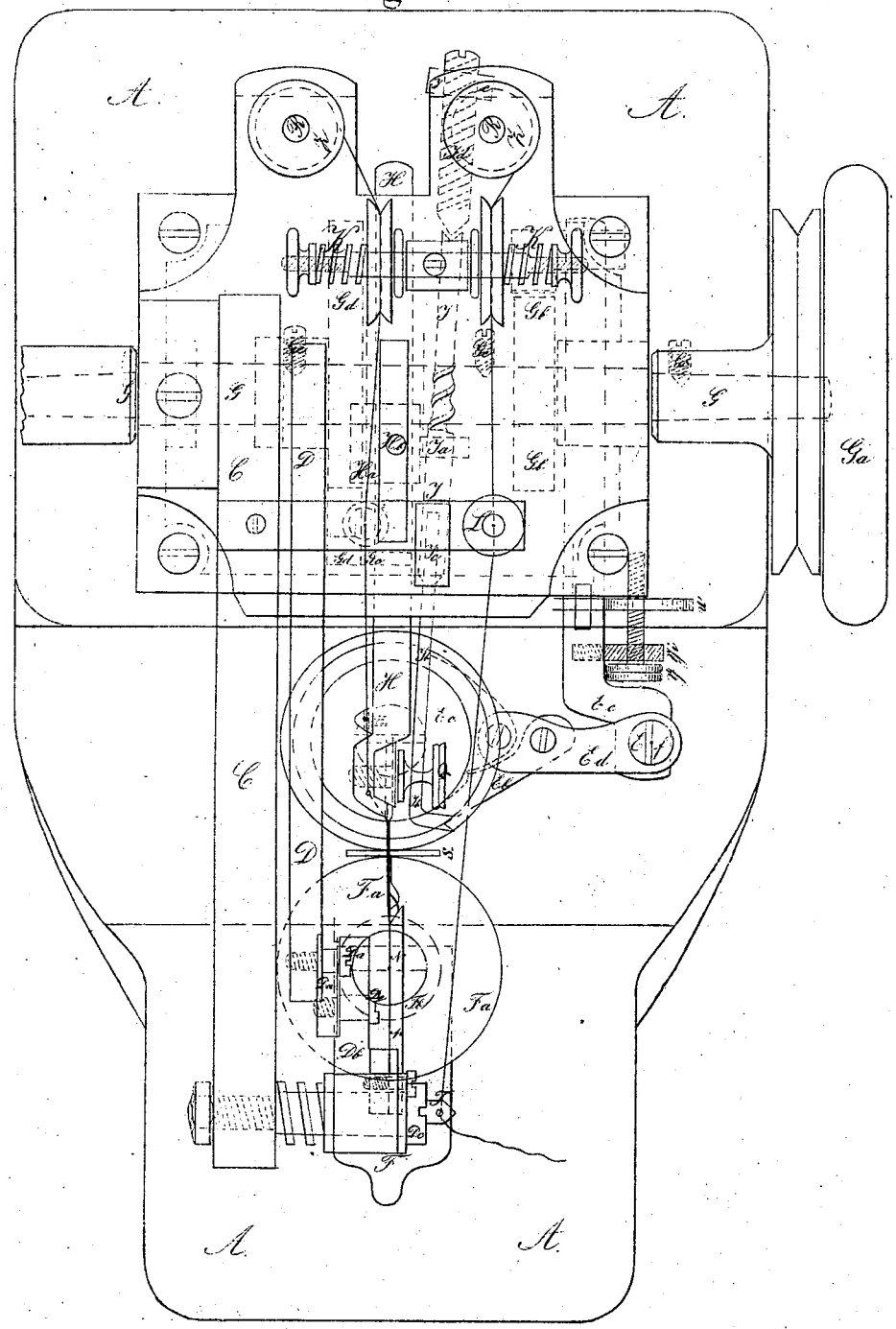
Figure 2:
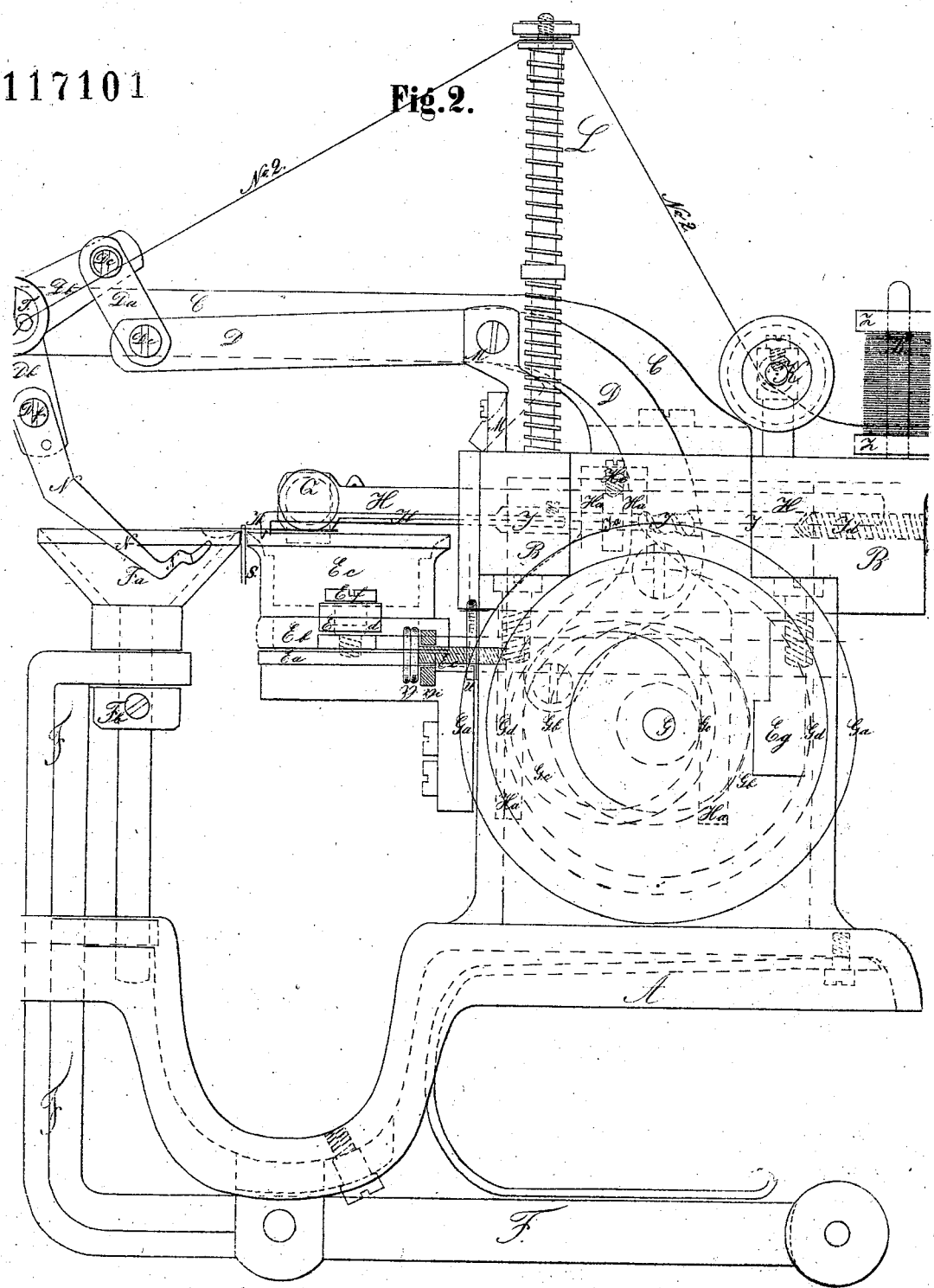
Figure 4:
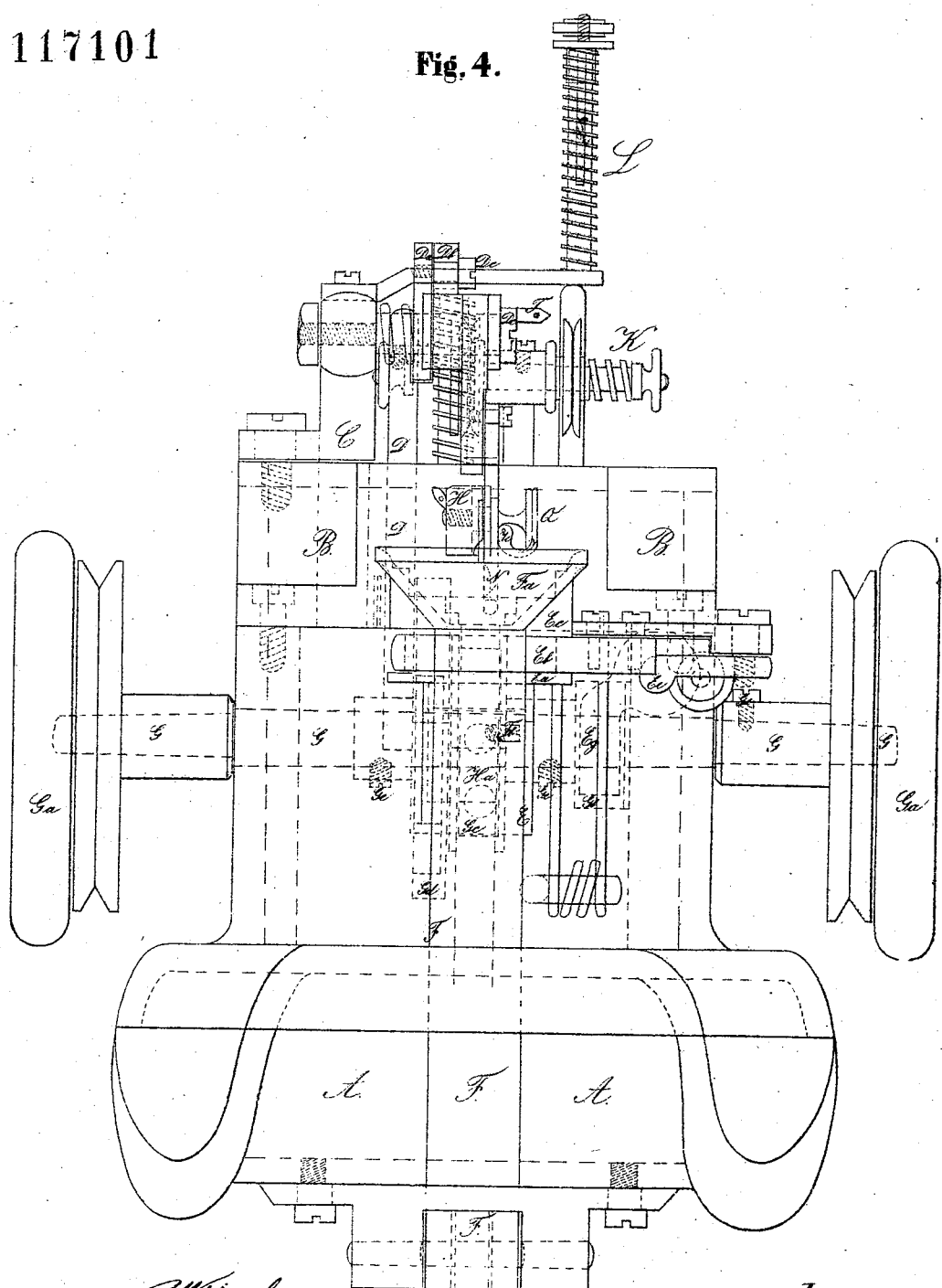
Figure 5:
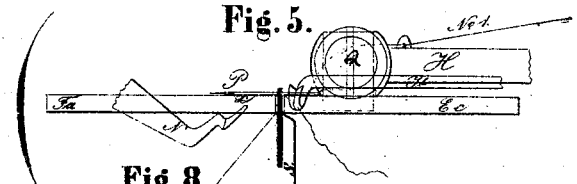
Figure 8:
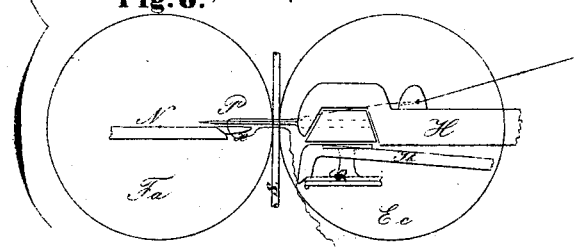
Figure 11:
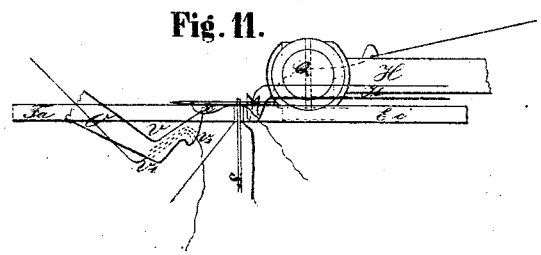
Figure 6:
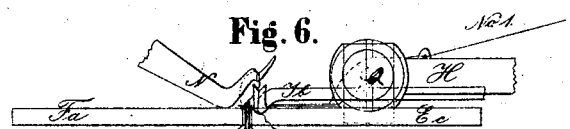
Figure 9:
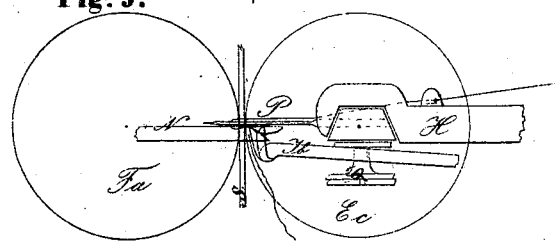
Figure 12:
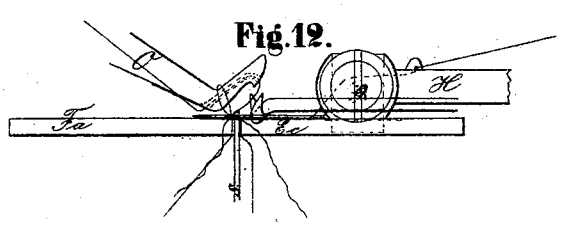
Figure 7:
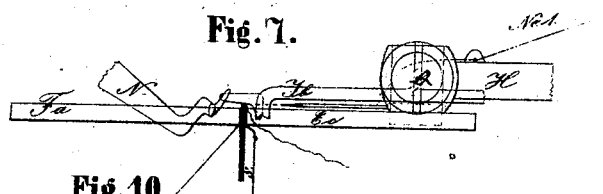
Figure 10:
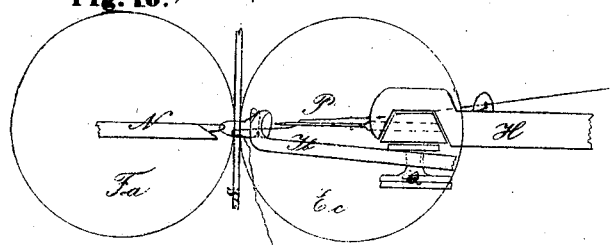
Figure 13:
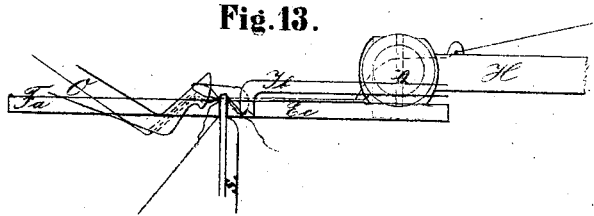

Figure 1, Sheet I, is a plan of a machine embodying my invention. Fig. 2, Sheet II, is a side view of the same. Fig. 3, Sheet III, is a back view. Fig. 4, Sheet IV, is a front view. Figs. 5 to 24, Sheet V to IX, represent detached parts, modifications, and operations of my machine.

In the following description I have endeavored to define the functions of separate parts of my machine, the working of the combined old and new parts, and the entire operation of my machine in producing the different sutures:

A is the base or bed of the machine, upon which is a head-piece, (see Fig. 3,) in the form of a box, composed of two iron sides and a perforated cover. Openings in the sides form bearings for the transverse driving-shaft G, which has at each end a pulley, G$a$, for the belt. Upon this driving-shaft, and within the box, are three eccentrics, G$b$ G$c$ G$d$, attached by means of the screws G$e$. One of the two driving-pulleys being turned to the right, (it is immaterial which of them is first put in motion,) the entire mechanism will be set in operation, it being solely dependent upon the three eccentrics keyed on the driving-shaft G. The three eccentrics G$b$ G$c$ G$d$ being within the box, their position in the machine is only indicated by dotted lines, Figs. 1, 2, 3, 4; but they are shown separately in Figs. 22, 23, and 25. The eccentric G$b$ gives a feed-motion to the fabric S to be sewn by means of the cylinder E$c$ moved from right to left by the sliding rod of the fabric-guide E$e$ aided by the link E$d$, which, by its friction, also gives motion to the cylinder. The parts of the machine constituting the mechanism for feeding the fabric to be sewn are (see Figs. 2 and 24) the fabric-guide E$c$, clutch E$b$, disk or plate E$a$, link E$d$, sliding rod for the fabric-guide E$e$, spring F$a$, (see Fig. 24,) angle of the sliding rod E$g$, eccentric G$b$, fabric-guide F$a$, hold-fast F, and adjunct of the fabric-guide F$a$, regulating-ring F$b$; screws for the fabric-guide E$c$, for the clutch E$b$, and for the link E$d$. The fabric-guide E$c$ is screwed upon the disk or plate E$a$ in such a manner that it may be turned around the screw E$f$, the fabric-guide E$c$ also turning round itself upon the disk or plate E$a$. On the side of the fabric-guide E$c$ nearest the disk E$a$ is a clutch, E$b$, (see Fig. 26,) attached to the sliding rod E$e$ of the fabric-guide by the link E$d$. The sliding rod E$e$ has an angle, E$g$, by which it is retired from the eccentric G$b$. This sliding rod is advanced by the spring F$a$ placed upon it, which spring has its bearings at one side on the bed A, and at the other side on the projecting guide. The clutch E$b$, moved from left to right by the link E$d$, presses upon the fabric-guide E$c$, moving it also from left to right. The fabric-guide F$a$ placed in the hold-fast F, being fixed by a spring upon the fabric-guide E$c$, travels with it.

The combined operation of these various parts is as follows: The shaft G being made to rotate, the sliding rod E$e$ of the fabric-guide is pushed back by the angle of the sliding rod E$g$ actuated by the eccentric G$b$, and the link E$d$ follows this motion. The link E$d$, which is in immediate connection with the clutch E$b$, gives to the fabric-guide E$c$, upon which presses the clutch, a movement from right to left equal to the amount of lift given in the rotation of the eccentric G$b$ by the point of its periphery furthest from the center. The fabric-guide E$c$ being thus set in motion, both the fabric-guide F$a$ moves at the same time, the edges of the fabric-guides meeting, and the fabric which is to be sewn is moved along without further aid. That point of the eccentric G$b$ which is furthest from the center having passed the angle E$g$ of the sliding rod, the sliding rod E$e$ is again advanced by the spring F$a$, but without giving motion to the fabric-guide E$c$, as the link E$d$ lifts the clutch E$b$ in its motion from right to left. To clearly specify the stitches made by my machine I must first mention that their position is regulated by the adjusting-screw Y, the fork Y$i$ on the sliding rod E$e$, and the nut-screw of the regulator with lever U. (See Figs. 1, 2, and 24.) The longest stitch is produced by the eccentric G$b$. When set in motion by the rotation of the driving-shaft G, that part of its periphery which is furthest from its center comes against the angle E$g$ of the sliding rod, while the forward motion of the sliding rod is dependent on the lift of the eccentric. If it is desired to make a shorter stitch, the adjusting-screw Y, inclosed within the fork Yi on the sliding rod Ee in its movement to and fro, must be screwed into the bed A more or less, as may be desired. In the forward movement of the sliding rod of the fabric-guide the fork Yi is pushed against the adjusting-screw Y, and the journey of the sliding rod Ee, link Ed, and clutch Eb is thereby shortened. The nut-screw U prevents any disarrangement of the screw Y. The eccentric Gc actuates the needle P, and also indirectly the circular thread-taker Tb, by the following parts of the machine: (See Figs. 1 and 2.) The needle-bar H, fork Ha, screw Hb, needle P, screw Q for fixing the needle, spiral shaft T, guide-slot Ta for spiral shaft, circular thread-taker Tb, screw Tc, pointed screw Td, and nut-screw Te. In order that the operation of this part of my machine may be thoroughly comprehended, I must add that the horizontal movement of the needle-bar H is directly effected by the eccentric Gc, Fig. 27. On this motion of the needle-bar not only depends the operation of the needle P, but also that of the circular thread-taker Tb set in motion by the shaft with flat spiral thread T, itself actuated by the fork Ha on the needle-bar H, together with its conducting-slot Ta. The eccentric Gd, which I have been compelled to divide, as shown, Figs. 22 and 25, in order that the parts of the machine dependent thereon may work in the manner required by the combined mechanism, by means of the link Da and bell-crank Db now set in operation by the arm D, gives a circular up-and-down motion to the angular thread-taker N for sewing with one thread, and also to the angular thread-taker O for sewing with two threads. I will first explain more clearly the division I have made of the eccentric Gd. This eccentric is divided into 360 degrees. The extent of the contour of the curve most remote from the center has a length of $\frac{14}{360}$; in turning from left to right the first fall amounts to $\frac{29}{360}$, the first stop to $\frac{122}{360}$; the second fall to $\frac{24}{360}$, the second stop to $\frac{114}{360}$; and the rise to the highest point has a length of $\frac{57}{360}$ degrees. The distance from the center to the periphery of the eccentric is at the highest point 25 millimeters, at the first stop 23½, and at the second stop 22 millimeters. Such a division of the eccentric Gd is absolutely required in order to obtain the desired operation of the combined parts. The parts of the machine dependent on the eccentric Gd are, (see Fig. 2,) 1st, the arm C; 2d, the arm D; 3d, the link Da and bell-crank Db; 4th, the screw Dc; 5th, the screw De; 6th, the angular thread-taker N or the carrier O; 7th, the screw Df for fastening the angular thread-taker.

The operation takes place as follows: On the top B of the box-shaped head-piece is the fixed arm C, and near it the arm D, the lower part of which, led through a hole in the cover of the box-shaped head-piece to the eccentric Gd, carries a pulley, which, moving within the curve of the eccentric Gd, receives motion therefrom in the manner necessitated by the above-described division. The arm D, at the upper end of which is the link Da, is partly connected to the small screw De and partly to the bell-crank Db, which is the actual guide of the angular thread-taker. The angular thread-taker has an elbow, and is fastened at this point D to the arm C by the screw De, thereby producing the various movements of the eccentric Gd of the angular thread-taker N or carrier O fastened upon the bell-crank Db by the screws Df. (See Figs. 5 to 13.) Before describing the main operation of the machine in the execution of a mantua-maker's hem with one thread or with two threads, I will mention the other important parts of my machine. The thread No. 1 which comes from the left yarn-spool, as seen from the fabric-guides, is not only to be used for the single-thread seam, but it also forms the lower thread of a double-thread mantua-maker's hem, of which thread No. 2 forms the upper thread. This thread No. 2 comes from the right-hand yarn-spool F, (see Fig. 2,) which is on the spool-pin R, takes its way over the right-hand thread-stretcher K, through the upper thread-adjuster L, through the eye T fixed upon the screw Dc; then through the eye $V^1$ on the elbow V of the angular thread-taker C along the thread-groove, and finally out through the eye $V^2$ at the head of the angular thread-taker O. (See Figs. 1 and 11.) The thread No. 1 comes from the left-hand yarn-spool F, passes over the left-hand thread-stretcher K through the lower thread-adjuster $L^1$, then between the check-spring M screwed upon the arm D, and finally through the eye at the head of needle P.

To execute with my machine a single-thread mantua-maker's hem, susceptible of transformation into a draw-stitch, it is necessary that the needle P, the eyeless angular thread-taker N, and the circular thread-taker Tb operate as follows: The fabric S to be sewn (cloth, linen, leather, oil-skin, fur, or other material) is nipped between the aforesaid cylinders or fabric-guides Fa and Ec; the machine is then set working from right to left, and the needle P carries the thread No. 1 through the fabric S, Fig. 5, whereon, the needle being slightly withdrawn, it forms a loop. (See Fig. 5.) This loop is caught by the angular thread-taker N, carried to a height regulated by the eccentric Gd, Fig. 6, and is at the same moment seized by the circular thread-taker Tb and drawn downward. (See Fig. 7.) The loop thus drawn down and held by the two thread-takers N and Tb is thereby opened, and permits the needle P in its second journey to pass through it without impediment. This operation having taken place, the two thread-takers N and Tb return to their primitive position, releasing the loop, which, being then drawn tight by the tension of the thread No. 1, the stitch, forming a single-thread mantua-maker's hem, is produced. The fabric S is now immediately pushed by the fabric-guides Fa and Ec as far forward as the position of the stitches may require, and the next stitch is executed in the same manner. To use this stitch as a flat or draw-stitch the two parts sewn together must be laid flat and drawn apart.

The two-thread mantua-maker's hem, which may also be sewn by my machine, is obtained almost in the same manner as the single-thread hem above described, the following changes being made in the machine: The angular thread-taker N used for the single-thread stitch is unscrewed and replaced by the angular thread-taker or carrier O, which has an eye. The thread No. 2 drawn through the needle, as previously described and shown, Figs. 1 and 4, must now begin its operation. The needle P having carried the thread through the fabric S and slightly retired, Fig. 11, the angular thread-taker or carrier O takes the loop formed by the withdrawal of the needle P of thread No. 1, Fig. 12, with a semicircular motion and draws it to its elbow V, Fig. 12. The circular thread-taker T$b$ now takes thread No. 2, draws it downward, Fig. 13, and the needle P passes through the loop formed by the circular thread-taker of the thread No. 2, and the mantua-maker's hem with two threads is accomplished.

I claim as my invention—

1. The combination of needle P, circular thread-taker T$b$, and angular thread-taker N, when constructed, arranged, and operated by means substantially as hereinbefore described.

2. The combination of needle P, circular thread-taker T$b$, and carrier O, when constructed, arranged, and operated by means substantially as hereinbefore described.

3. The combination, with the arm C, of the arm D, link D$a$, and bell-crank D$b$, when operated substantially as described, and adapted to carry either the thread-taker N or O.

CARL NECKER.

Witnesses:
Dr. TH. BLANCK,
GLEIURID W. RAESKE.